(12) United States Patent
Fujii

(10) Patent No.: US 10,103,671 B2
(45) Date of Patent: Oct. 16, 2018

(54) CONTROL APPARATUS FOR ROTARY ELECTRIC MACHINE

(71) Applicant: DENSO CORPORATION, Kariya, Aichi-pref. (JP)

(72) Inventor: Kiyoshi Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/545,263

(22) PCT Filed: Jan. 22, 2016

(86) PCT No.: PCT/JP2016/051814
§ 371 (c)(1),
(2) Date: Jul. 20, 2017

(87) PCT Pub. No.: WO2016/117672
PCT Pub. Date: Jul. 28, 2016

(65) Prior Publication Data
US 2018/0013369 A1   Jan. 11, 2018

(30) Foreign Application Priority Data
Jan. 22, 2015 (JP) .................................. 2015-010329

(51) Int. Cl.
| | |
|---|---|
| *H02P 1/50* | (2006.01) |
| *H02P 1/46* | (2006.01) |
| *H02P 25/022* | (2016.01) |
| *H02P 23/14* | (2006.01) |
| *H02P 25/22* | (2006.01) |
| *H02K 1/14* | (2006.01) |

(52) U.S. Cl.
CPC ............ *H02P 25/022* (2013.01); *H02P 23/14* (2013.01); *H02P 25/22* (2013.01); *H02K 1/145* (2013.01)

(58) Field of Classification Search
None
See application file for complete search history.

(56) References Cited

U.S. PATENT DOCUMENTS

2008/0129243 A1* 6/2008 Nashiki .................. H02K 1/145
                                                          318/701

FOREIGN PATENT DOCUMENTS

| JP | 2008-109759 A | 5/2008 |
|---|---|---|
| JP | 2009-183051 A | 8/2009 |

* cited by examiner

*Primary Examiner* — Bentsu Ro
*Assistant Examiner* — Zemenay Truneh
(74) *Attorney, Agent, or Firm* — Oliff PLC

(57) ABSTRACT

In a control apparatus for a rotary electric machine, a first manipulation unit manipulates, as control for a predetermined first region with respect to the controlled variable, a voltage phase of a voltage vector applied to an armature winding while controlling a field current to cause a deviation between an amplitude of an induced voltage and an amplitude of a predetermined voltage to be equal to or smaller than a predetermined value, the induced voltage being generated in the armature winding based on rotation of the rotor, the predetermined voltage being applied to the armature winding; A second manipulation unit that manipulates, as control for a second region that is larger than the first region, the field current such that the controlled variable is controlled to the target value.

12 Claims, 12 Drawing Sheets

(a) ω = LOW (b) ω = HIGH (a) ω = LOW (b) ω = HIGH

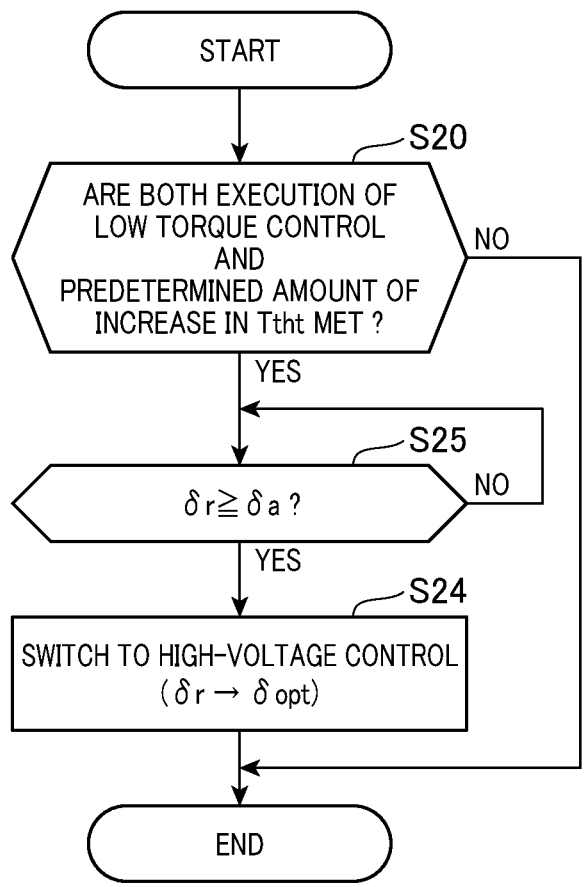

CONTROL APPARATUS FOR ROTARY ELECTRIC MACHINE

TECHNICAL FIELD

The present invention relates to a control apparatus applied to a wound-field rotary electric machine.

BACKGROUND ART

Conventional wound-field rotary electric machines include a rotor with a field coil through which a field current flows, and a stator with an armature coil through which an armature current flows. Such a wound-field rotary electric machine is desired to have improved power efficiency. To fulfill this requirement, patent literature 1 described below discloses a control apparatus and a control method for controlling a rotary electric machine. The control apparatus and control method are configured to control the rotary electric machine based on a control map comprised of the combination between the phases of voltages applied to the armature coil and field currents. The control map is designed to minimize power loss.

CITATION LIST

Patent Literature

Japanese Patent Application Publication No. 2008-109759

SUMMARY

Technical Problem

Unfortunately, the control apparatus described in patent literature 1 controls a rotary electric machine based on a control map comprised of the combination between the phases of voltages applied to the armature coil and field currents. That is, to use the control apparatus described in patent literature 1, it is necessary to prepare this control map and establish an algorithm for controlling the rotary electric machine based on this control map. Preparing the control map and establishing the algorithm for controlling the rotary electric machine based on the control map require a great amount of work.

There are therefore requirements to develop control apparatuses for controlling a rotary electric machine with reduced power loss, each of the control apparatuses that controls a rotary electric machine more simply than control apparatuses each controls a rotary electric machine based on the control map.

In view of the above problems, the present invention seeks to provide, as a control apparatus for controlling a wound-field rotary electric machine with reduced power loss, a control apparatus that controls a rotary electric machine more simply than control apparatuses each controlling a rotary electric machine based on the control map.

Solution to Problem

The following describes means for solving the above-mentioned problems, and advantageous effects based on the means.

One aspect of the present invention is a control apparatus applied to a rotary electric machine (10) including a rotor (12) having a field winding (11) through which a field current flows, and a stator (13) having an armature winding (10a, 10b) through which an armature current flows. The control apparatus has, as a controlled variable, torque of the rotary electric machine or a parameter that has a positive correlation with the torque. The control apparatus includes a first manipulation unit that manipulates, as control for a predetermined first region with respect to the controlled variable, a voltage phase of a voltage vector applied to the armature winding while controlling the field current to cause a deviation between an amplitude of an induced voltage and an amplitude of a predetermined voltage to be equal to or smaller than a predetermined value. The induced voltage is generated in the armature winding based on rotation of the rotor, and the predetermined voltage is applied to the armature winding. The control apparatus includes a second manipulation unit that manipulates, as control for a second region that is larger than the first region, the field current such that the controlled variable is controlled to the target value.

The inventors of the present application have determined that, as the amplitude of the applied voltage to the rotary electric machine approaches the amplitude of the induced voltage, the amplitude of the armature current decreases. The decrease in the amplitude of the armature current enables the electric power loss caused by the armature current to decrease. From this viewpoint, the aspect of the present invention is configured such that the first manipulation unit manipulates the voltage phase of the voltage vector applied to the armature winding while controlling the field current to cause the deviation between the amplitude of the induced voltage and the amplitude of the predetermined voltage applied to the armature winding to be equal to or smaller than the predetermined value. As described above, such simpler control, which adjusts the deviation to be equal to or smaller than the predetermined value, enables the controlled variable to match with the target value while reduces the power loss.

The field current, which makes the deviation between the amplitude of the induced voltage and the amplitude of the predetermined voltage applied to the armature winding equal to or smaller than the predetermined value, is a relatively small value. For this reason, when the target value of the controlled variable becomes high, controlling the controlled variable by the first manipulation unit might result in the controlled variable being insufficient with respect to the target value, so that the controlled variable might not follow the target value.

From this viewpoint, the aspect of the present invention sets the predetermined first region with respect to the controlled variable, and the predetermined second region with respect to the controlled variable, which is larger than the first region. Then, the first manipulation unit, which serves to control for the first region, manipulates the voltage phase to control the controlled variable to the target value.

Additionally, the second manipulation unit, which serves to control for the second region, changes, as the manipulated variable, the voltage phase to the field current, and manipulates the field current such that the controlled variable is controlled to the target value. This enables the controlled variable to reliably follow the target value even if the target value becomes high.

BRIEF DESCRIPTION OF THE DRAWINGS

FIG. 16 is a flowchart schematically showing an example of a rapid switching process to switch from the low torque control to the high torque control according to the third embodiment.

DESCRIPTION OF THE EMBODIMENTS (First Embodiment)

The following describes the first embodiment in which a control system CS including a control apparatus for a rotary electric machine according to the present invention is applied to a vehicle installing therein an internal combustion engine as a main engine with reference to the accompanying drawings. Note that, in the first embodiment, a motor 10 is mounted on the vehicle as the rotary electric machine to be controlled.

Figure 1:
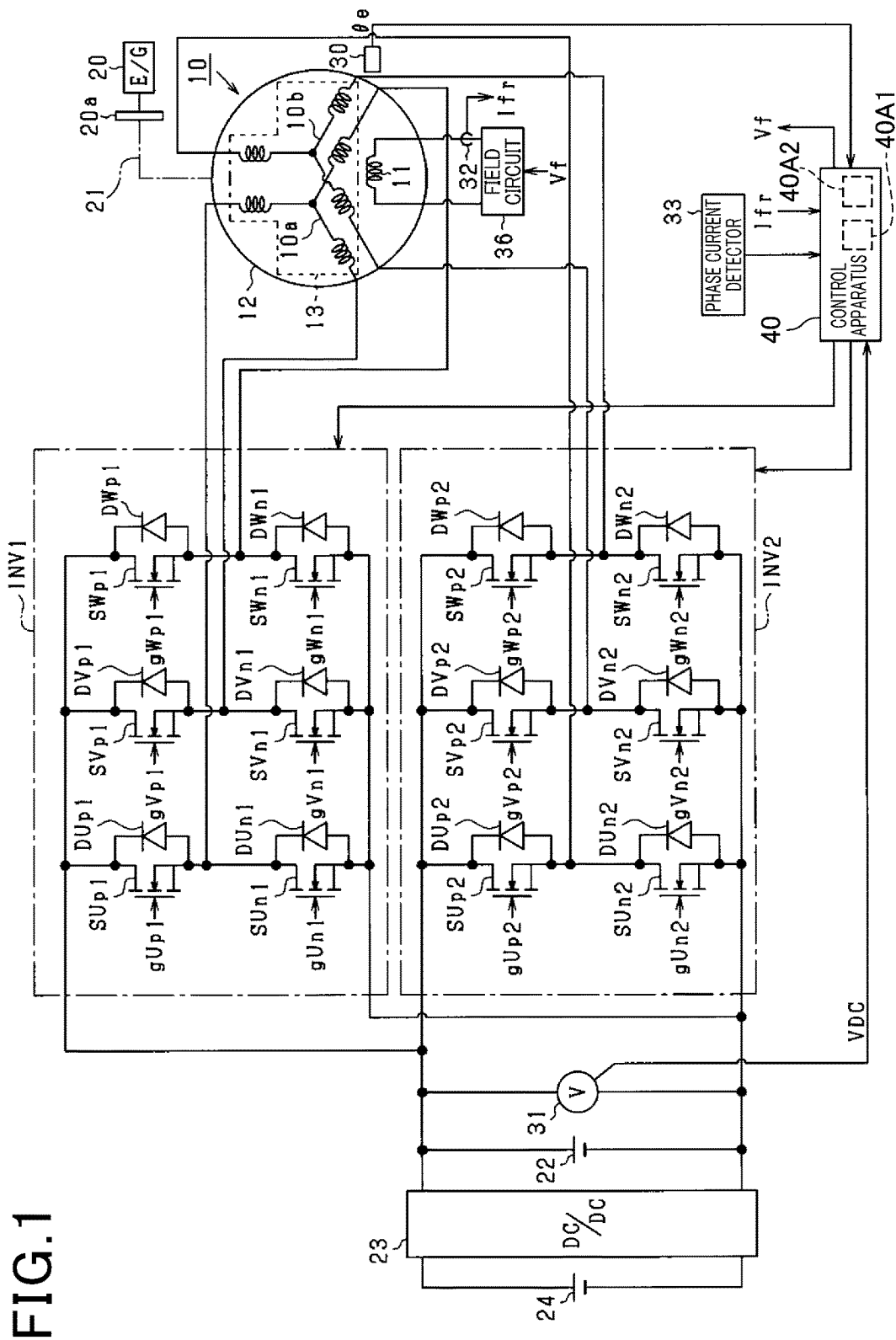
FIG. 1 is an overall configuration diagram of an on-vehicle motor control system according to the first embodiment of the present invention.

As shown in FIG. 1, the motor 10 is, for example, a wound-field rotary electric machine including multi-phase multi-turn windings, specifically, a wound-field synchronous motor including three-phase double-turn windings. In the first embodiment, the motor 10 serves as an ISG (Integrated Starter Generator) integrating the functions of a starter and an alternator, i.e. a generator. In particular, the vehicle according to the first embodiment is capable of carrying out, in addition to the initial start of the engine 20, an idling reduction function. The idling reduction function is configured to automatically stop the engine 20 when a predetermined automatic stop condition is satisfied, and automatically restart the engine 20 when a predetermined restart condition is satisfied. When this vehicle executes the idling reduction function, the motor 10 functions as a starter. The first embodiment uses a salient pole motor as the motor 10.

The motor 10 has a rotor 12, and the rotor 12 has a field coil 11. In addition, the rotor 12 is capable of transmitting power to a crankshaft 20a of the engine 20. For example, in the first embodiment, the rotor 12 is mechanically connected to the crankshaft 20a via a belt 21 or the like. When the field coil 11 is energized, at least one pair of magnetic poles (N pole and S pole) is generated. The direction of the magnetic flux generated by the N pole is assumed to be a d axis, and the axis that is electrically orthogonal to the d axis is assumed to be a q axis. That is, the rotor 12 has a d axis and a q axis, and as a result, the rotor 12 has a dq coordinate system, i.e. a rotational coordinate system, composed of the d axis and the q axis.

The motor 10 has a stator 13. In the stator 13, two groups of armature windings (hereinafter referred to as the first winding group 10a and the second winding group 10b) are wound. The magnetic effect caused by energizing the first and second winding groups 10a and 10b acts on the common rotor 12. Each of the first winding group 10a and the second winding group 10b includes three-phase windings. The three-phase windings of the first winding group 10a has a neutral point as their common first end, i.e. a first terminal. Similarly, the three-phase windings of the second winding group 10b have a neutral point as their common first end. In the first embodiment, the first winding group 10a and the second winding group 10b have the same configuration. Thus, the number of turns of each of the windings constituting the first winding group 10a and the number of turns of the winding constituting the second winding group 10b are set to be equal to each other.

The control system CS includes two power converters (hereinafter referred to as a first inverter INV1 and a second inverter INV2) corresponding to the first winding group 10a and the second winding group 10b, respectively.

The first inverter INV1 and the second inverter INV2 are electrically connected to the motor 10. Specifically, the first inverter INV1 is connected to the first winding group 10a and the second inverter INV2 is connected to the second winding group 10b.

A high voltage battery 22 is connected in parallel to the first inverter INV1 and the second inverter INV2 as their common DC power supply. A step-up DC-DC converter 23 is connected in parallel to the high voltage battery 22, and a low-voltage battery 24 is connected in parallel to the step-up DC-DC converter 23. That is, the output voltage of the low voltage battery 24 boosted by the step-up DC-DC converter 23 can be applied to the high voltage battery 22. The output voltage of the low voltage battery 24 (for example, a lead storage battery) is set to be lower than the output voltage of the high voltage battery 22 (for example, a lithium ion storage battery).

The first inverter INV1 includes three sets of series connections of first U, V, W-phase high-side switches SUp1, SVp1, SWp1 and first U, V, W-phase low-side switches SUn1, SVn1, SWn1. The connection points of the U, V, W phase series connections are connected to the terminals of the first winding group 10a corresponding to the U, V, W-phase second ends. In the first embodiment, N-channel MOSFETs are used as the switches Sup1-SWn1. Diodes DUp1-DWn1 are connected in antiparallel to the respective switches SUp1-SWn1. The diodes DUp1-DWn1 may be intrinsic diodes of the switches SUp1-SWn1. In addition, the switches SUp1-SWn1 are not limited to N-channel MOSFETs, and they may be, for example, IGBTs.

Like the first inverter INV1, the second inverter INV2 includes three sets of series connections of second U, V, W-phase high-side switches SUp2, SVp2, SWp2 and second U, V, W-phase low-side switches SUn2, SVn2, SWn2. The connection points of the U, V, W-phase series connections are connected to the U, V, W-phase second ends (second terminals) of the second winding group 10b. In the first embodiment, N-channel MOSFETs are used as the switches Sup2-SWn2. Diodes DUp2-DWn2 are connected in antiparallel to the respective switches SUp2-SWn2, respectively. The diodes DUp2-DWn2 may be intrinsic diodes of the switches SUp2-SWn2. In addition, the switches SUp2-SWn2 are not limited to N-channel MOSFETs, and they may be, for example, IGBTs.

The positive terminal of the high voltage battery 22 is connected to the high potential side terminals, i.e. the drains of the high-side switches, of the first and second inverters INV1 and INV2. The negative terminal of the high voltage battery 22 is connected to the low-side terminals, i.e. the sources of the low-side switches, of the first and second inverters INV1 and INV2.

This configuration of the first and second inverters IV1 and IV2 includes a function of, in a power running mode for driving the motor 10 as a starter, converting the DC voltage output from the high voltage battery 22 into an AC voltage, and applying the AC voltage to the first and second winding groups 10a and 10b. In addition, this configuration of the first and second inverters IV1 and IV2 includes a function of, in a regenerative mode for driving the motor 10 as a power generator, converting the AC voltage output from the first and second winding groups 10a and 10b into a DC voltage, and applying the DC voltage to the high voltage battery 22.

A DC voltage can be applied to the field coil 11 by a field circuit 36. The field circuit 36 adjusts the DC voltage applied to the field coil 11, thus controlling the field current flowing through the field coil 11.

The control system CS according to the first embodiment includes a rotation angle sensor 30, a voltage sensor 31, a field current sensor 32, and a phase current detector 33.

The rotation angle sensor 30 is a rotation angle detection means for detecting the rotation angle, i.e. electrical angle, of the motor 10. The voltage sensor 31 is a voltage detection means for detecting the voltage between the terminals of the high voltage battery 22; the voltage between the terminals of the high voltage battery 22 will be referred to as a battery voltage.

The field current sensor 32 is a field current detection means for detecting the field current flowing through the field winding 11. The phase current detector 33 is a phase current detection means for detecting 1. Each phase current flowing through the first winding group 10a, i.e. a current flowing through each of the three-phase windings of the first winding group 10a in the three-phase fixed coordinate system 2. Each phase current flowing through the second winding group 10b As the rotation angle sensor 30, for example, a resolver can be used. As each of the field current sensor 32 and the phase current detector 33, for example, a device provided with one or more current transformers and/or one or more resistors can be used.

The control system CS includes a control apparatus 40. The detected values of the various sensors 30 to 33 are supplied to the control apparatus 40.

The control apparatus 40 is a software processing means that includes a central processing unit (CPU), a memory, and the like, and configured such that the CPU executes programs stored in the memory. In order to control the controlled variables, such as the output torque of the motor 10, to their target values, the control apparatus 40 generates drive signals for driving the switches SUp1-SWn1 and SUp2-SWn2 of the first inverter INV1 and the second inverter INV2 based on the detection values of the various sensors 30-33, and outputs the drive signals to the respective switches SUp1-SWn1 and SUp2-SWn2.

In FIG. 1, the signals for controlling the switches SUp1-SWn1 of the first inverter INV1 are denoted as first drive signals gUp1-gWn1, and the signals for controlling the switches SUp2-SWn2 of the second inverter INV2 are denoted as the second control signals gUp2-gWn2. The field circuit 36 can either be installed in the control apparatus 40 or externally attached to the control apparatus 40.

In the first embodiment, the controlled variable of the motor 10 is set to the torque of the motor 10 output to the crankshaft 20a in the power running mode, and the controlled variable of the motor 10 is set to the output power, which is a parameter having a positive correlation with torque in the regenerative mode. That is, the control apparatus 40, which is operating in the power running mode, controls the torque of the motor 10 to target torque Ttgt which is a target value of the motor's torque. In addition, the control apparatus 40, which is operating in the regenerative mode, controls the generated power of the motor 10 to target power Ptgt which is a target value of the generated power of the motor 10.

Note that the controlled variable of the motor 10 can be set to electric power, i.e. electric power to be consumed, input to the motor 10 in the power running mode, or set to torque, i.e. loss torque due to the electric power generation, input to the motor 10 in the regenerative mode.

The control apparatus 40 includes a first manipulation unit 40A1 corresponding to, for example, a first manipulation means, and a second manipulation unit 40A2 corresponding to, for example, second manipulation means. The first manipulation unit 40A1 performs low torque control, and the second manipulation unit 40A2 performs high torque control. That is, the control apparatus 40 selectively performs the low torque control and high torque control.

That is, a low controlled variable region, i.e. a low torque region, is set for the controlled variable, such as the output torque or generated power, of the motor 10. The low torque region is a predetermined low region set to be lower than a predetermined threshold value. The control apparatus 40 performs, as low torque control for the low controlled variable region, i.e. low torque region, a task to manipulate the phase of the voltage vector of the inverter INV1 and the phase of the voltage vector of the inverter INV2. This voltage-phase manipulation aims to feedback control the controlled variable to match with the target value while maintaining the amplitude of the voltage applied to each of the winding groups 10a and 10b at a constant level.

For example, the control apparatus 40 performs the low torque control when the target value for the controlled variable is in the low torque region.

As the low torque control, the control apparatus 40 further controls a field current, which is referred to as Ifr, measured by the field current sensor 32 to an optimal current Iopt that reduces electric power loss caused when currents flow through the winding groups 10a and 10b.

Additionally, a high controlled variable region, i.e. a high torque region, is set for the controlled variable, such as the output torque or generated power, of the motor 10; the high controlled variable region, i.e. high torque region, is higher than the low controlled variable region, i.e. low torque region.

The control apparatus 40 performs, as high torque control for the high controlled variable region, i.e. high torque region, a task to manipulate the field current Ifr to feedback control the controlled variable to the target value in the high controlled variable region, i.e. high torque region, in which the values of the controlled variable of the motor 10 are higher than the values in the low torque region.

For example, the control apparatus 40 performs the high torque control when the target value for the controlled variable is in the high torque region.

When the target value for the controlled variable changes from the low torque region to the high torque region, or changes from the high torque region to the low torque region, for example, the control apparatus 40 executes a switching routine described later to thereby switch between the low torque control and the high torque control while maintaining low electric power loss.

The following describes the low torque control and high torque control, and thereafter describes a task for performing the low torque control and a task for performing the high torque control.

<1. Low Torque Control>

First, the following describes the low torque control. To begin with, the following describes the reason why a manipulated variable in the low torque control is not the field current Ifr but the voltage phase of the voltage vector of each of the inverters INV1 and INV2.

The reason why the voltage phase is used as the manipulated variable is to avoid deterioration of the responsivity of the controlled variable of the motor 10 that is feedback controlled to the target value.

Specifically, the field winding 11 is greater in the number of turns than each of the windings in the winding groups 10a and 10b, so that the field winding 11 has a larger reactance value and a larger time constant than each of the windings in the winding groups 10a and 10b. For this reason, if the field current Ifr were controlled to feedback control the controlled variable to the target value, the responsivity of the controlled variable would decrease. For this reason, the voltage phase is used as the manipulated variable in the low torque control.

Note that a voltage vector is defined as a vector composed of a d-axis voltage and a q-axis voltage in the dq coordinate system defined in the rotor 12. In addition, the voltage phase is defined such that, in the dq coordinate system, the positive direction of the voltage phase represents the counterclockwise direction relative to a predetermined reference direction, such as the positive direction of the q axis. In other words, the positive direction of the voltage phase represents the rotational direction from the positive direction of the q axis to the negative direction of the d axis. That is, the voltage phase is set to zero when the q-axis voltage of the voltage vector is positive and the voltage vector overlaps with the q-axis.

Figure 2:
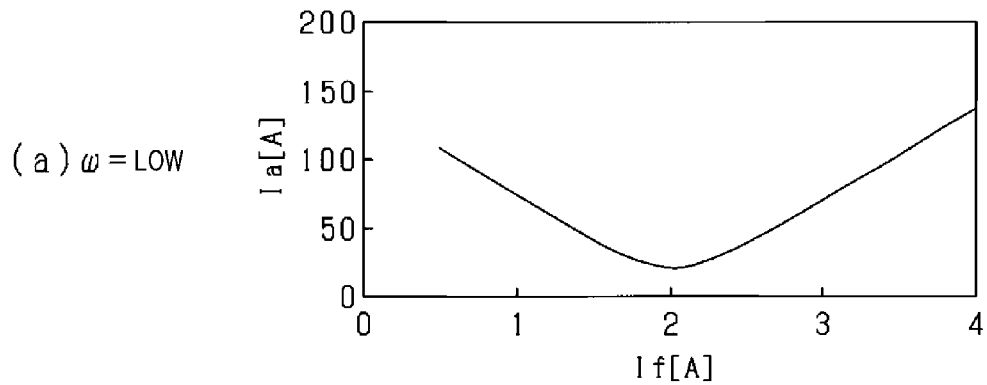
FIG. 2 is a graph showing the relationship between a current amplitude and a field current.
Figure 3:
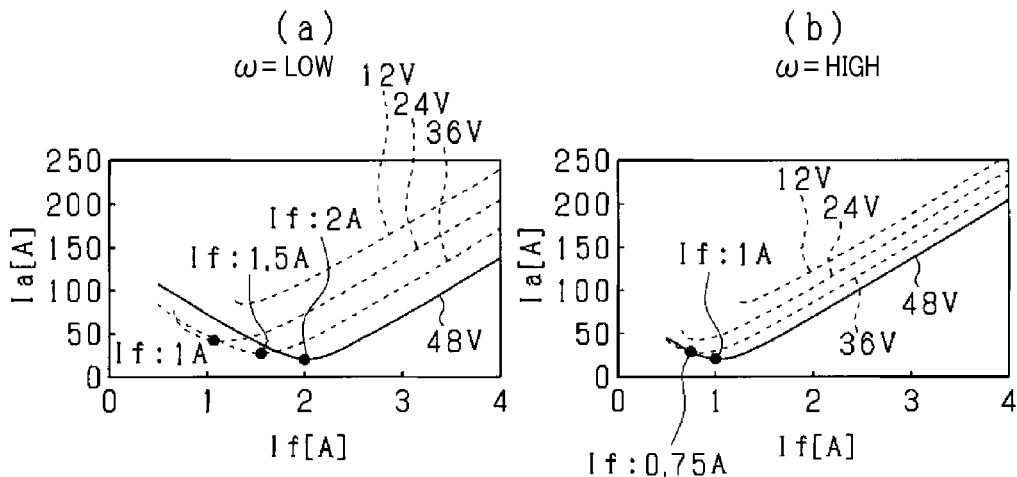
FIG. 3 is a diagram showing the relationship between the current amplitude and the field current when a voltage applied to the motor shown in FIG. 1 is changed.
Figure 4:
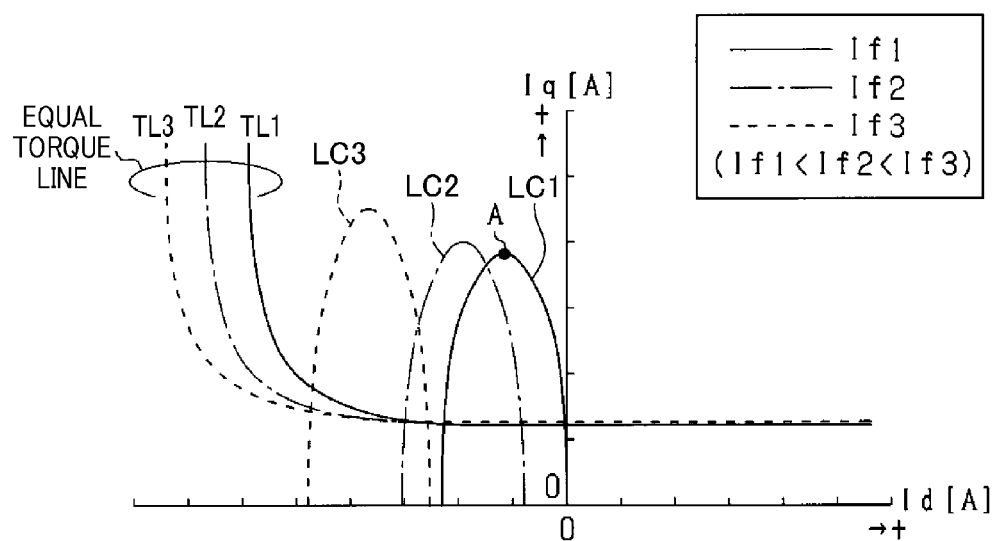
FIG. 4 is a diagram showing the relationship between voltage limitation circles and equal torque lines when the field current is changed in low torque control.

Next, the following describes an optimum current Iopt that minimizes power loss, i.e. copper loss, with reference to FIGS. 2 to 4.

FIG. 2 shows the relationship between the field current If and the current amplitude Ia under the conditions that the controlled variable of the motor 10, for example, generated power, is maintained at a constant value and the amplitude of the voltage applied to the motor 10 is maintained at a constant value of 48 V. The current amplitude Ia is defined as the magnitude of the current vector of the motor 10 represented by the pair of the d-axis current Id and the q-axis current Iq.

As shown in (a) of FIG. 2, there is a value of the field current If at which the current amplitude Ia is minimized. Specifically, an increase of the field current If from 0 results in the current amplitude Ia being minimized. Thereafter, a further increase of the field current If increases the current amplitude Ia. This is because, the further increase of the field current If causes the magnitude of the d-axis current Id to increase in the negative direction, resulting in an increase of useless torque of the motor 10.

(b) of FIG. 2 shows the relationship between the current amplitude and the field current, which is obtained when the electrical angular velocity ω of the motor 10 is a value higher than a value of the electrical angular velocity ω of the motor 10 at which the relationship illustrated in (a) of FIG. 2 is obtained.

As shown in (a) and (b) of FIG. 2, the value of the field current If at which the current amplitude Ia is minimized changes depending on the electrical angular velocity ω. Because the copper loss decreases as the current amplitude Ia decreases, setting the optimum current Iopt based on the electrical angular velocity ω enables the copper loss to be reduced.

Additionally, as illustrated in FIG. 3, the value of the field current If at which the current amplitude Ia is minimized also changes depending on the voltage applied to the motor 10. FIG. 3 shows the relationship between the amplitude of the applied voltage, the field current If, and the current amplitude Ia under the condition that the controlled variable is maintained at a constant value. The electrical angular velocity ω shown in (a) of FIG. 3 is lower than the electrical angular velocity ω shown in (b) of FIG. 3.

As shown in (a) and (b) of FIG. 3, the value of the field current If at which the current amplitude Ia is minimized changes depending on changes of 12V, 24V, 36V, and 48V in the amplitude of the voltage applied to the motor 10 shown in FIG. 3 as examples. The examples illustrated in (a) and (b) of FIG. 3 show that the larger the amplitude of the voltage applied to the motor 10 is, the smaller the minimum value of the current amplitude Ia is. Thus, when the amplitude of the voltage applied to the motor 10 is set to the possible maximum value (for example, 48 V) in the control system CS, the control apparatus 40 determines the value of the field current Id, which minimizes the current amplitude Ia, as the optimum current Iopt.

Next, the following describes a specific method for setting the optimum current Iopt that minimizes the current amplitude Ia in, for example, the power running mode as an example. FIG. 4 shows voltage limitation circles LC1, LC2, and LC3 if the field current If is set to three different values If1, If2, and If3 in the power running mode. Strictly, parts of the voltage limitation circles LC1, LC2, and LC3, whose q-axis currents Iq are equal to or higher than zero, are illustrated in FIG. 4. Note that the field current If3 is set to be larger than the field current If2 and the field current If2 is set to be larger than the field current If1.

A voltage limitation circle represents the trajectory of a current vector when the amplitude of the voltage applied to the motor 10 is maintained at a constant value. In the regenerative mode, parts of the voltage limitation circles LC1, LC2, and LC3, whose q-axis currents Iq are equal to or lower than zero, are used. FIG. 4 also shows the equal torque lines TL1, TL2, TL3 of the motor 10 when the field current is set to the respective values If1, If2, and If3.

As shown in FIG. 4, for setting the field currents If1, If2, If3, the intersection of each of the voltage limitation circles LC1, LC2, and LC3 and a corresponding one of the equal torque lines TL1, TL2, and TL3 shows the combination of the d-axis current Id and the q-axis current Iq, i.e. the current vector, which achieves the target torque Ttgt and the amplitude of the voltage applied to the motor 10.

The inventors of the present invention have determined in experiments that the current amplitude Ia is minimized when the field current becomes a value at which the amplitude of the voltage applied to the motor 10 matches with the amplitude of the induced voltage induced in the motor 10 (that is, the armature winding groups 10a and 10b). For this reason, setting the field current that causes the amplitude of the voltage applied to the motor 10 to match with the amplitude of the induced voltage induced in the motor 10 as the optimum current Iopt enables the copper loss to be minimized.

Specifically, the d-axis current Id can be expressed by the following equation (eq 1):

$$Id = \frac{1}{Ld}\left\{-\phi(If) + \sqrt{\left(\frac{Va}{\omega}\right)^2 - (Lq \cdot Iq)^2}\right\} \quad (eq\ 1)$$

In the equation (eq 1), φ(If) represents interlinkage flux, magnetic field flux, generated by the field current If, Ld and Lq represent the d- and q-axis inductances of each of the winding groups 10a and 10b, and Va represents the amplitude of the voltage applied to the motor 10. The voltage limitation circle can be expressed in the dq coordinate system using the above equation (eq 1).

Setting the d- and q-axis currents Id and Iq to be zero in the above equation (eq 1) enables the following equation (eq 2) to be derived:

$$\omega \cdot \phi(If) = Va \quad (eq2)$$

Where ω represents the electrical angular velocity.

The relationship "φ(If)=Lf×If" enables the following expression (eq3) to be established:

$$\phi \cdot \phi(If) = \omega \cdot Lf \cdot If \quad (eq3)$$

Where Lf represents the self-inductance of the field winding 11.

From the above equations (eq 2) and (eq 3), the following equations (eq 4A) and (eq 4A) can be derived:

$$\omega \cdot Lf \cdot If = Va \quad (eq\ 4A)$$

$$If = \frac{Va}{\omega \cdot Lf} \quad (eq\ 4B)$$

The above equation (eq4B) is derived from the fact that the amplitude Va of the voltage applied to the motor 10 matches with the amplitude of the induced voltage in the motor 10.

Setting the field current, i.e. the optimum current Iopt, based on the equations (eq4) enables the current amplitude Ia to be minimized. Note that the equations (eq4) are derived on condition that Id=Iq=0. That is, when the amplitude of the voltage applied to the motor 10 matches with the amplitude of the induced voltage induced in the motor 10, the right end of the voltage limitation circle overlaps with the origin of the dq coordinate system, and the voltage limitation circle is tangent to the q-axis. In this case, the intersection of the voltage limitation circle and the equal torque line is also close to the origin. Further, the d-axis current Id at the intersection is about 0. This therefore enables the wasted torque of the motor 10 to be reduced, resulting in reduction of power loss.

<2. High Torque Control>

Next, the following describes the high torque control.

In the low torque control in which the field current Ifr is controlled to the optimum current Iopt, when the target value of the controlled variable increases, moving the current vector from the origin of the dq coordinate system towards the vertex of the voltage limitation circle enables the controlled variable, such as the output torque, to increase. In FIG. 4, the vertex of the voltage limitation circle in the power running mode is represented as reference character A.

However, the maximum value of the controlled variable is limited by the q-axis current Iq at the vertex A of the voltage limitation circle.

In view of these circumstances, in order to adjust the controlled variable to the target value, the control apparatus 40 performs, in the high torque region, high torque control that controls the field current Ifr to a current larger than the optimum current Iopt.

Figure 5:
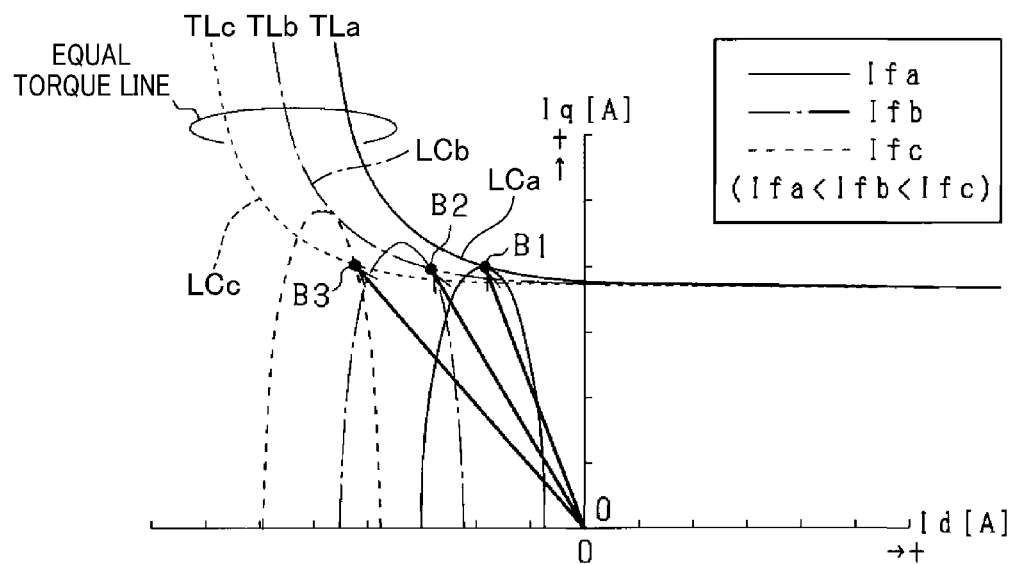
FIG. 5 is a diagram showing the relationship between voltage limitation circles and equal torque lines when the field current is changed in high torque control.

FIG. 5 illustrates parts of voltage limitation circles LCa, LCb, and LCc and equal torque lines TLa, TLb, and TLc if the field current is set to three different values Ifa, Ifb, and Ifc, which are higher than the optimum current Iopt, in the power running mode. Strictly, the parts of the voltage limitation circles LCa, LCb, and LCc, whose q-axis currents Iq are equal to or higher than zero, are illustrated in FIG. 5. Note that the field current Ifc is set to be larger than the field current Ifb and the field current Ifb is set to be larger than the field current Ifa.

For setting the field currents Ifa, Ifb, Ifc, the intersection of each of the voltage limitation circles LCa, LCb, and LCc and a corresponding one of the equal torque lines TLa, TLb, and TLc shows the combination of the d-axis current Id and the q-axis current Iq, i.e. the current vector, which achieves the target torque Ttgt and the amplitude of the voltage applied to the motor 10.

As the field current increases, the voltage limitation circle moves away from the q-axis in the negative direction of the d-axis. FIG. 5 shows intersections B1, B2, B3 of the voltage limitation circles LCa, LCb, and LCc and the respective equal torque lines TLa, TLb, and TLc as an example when the respective field currents Ia, Ib, and Ic are set.

<3. The Operations by the Control Apparatus>

Figure 6:
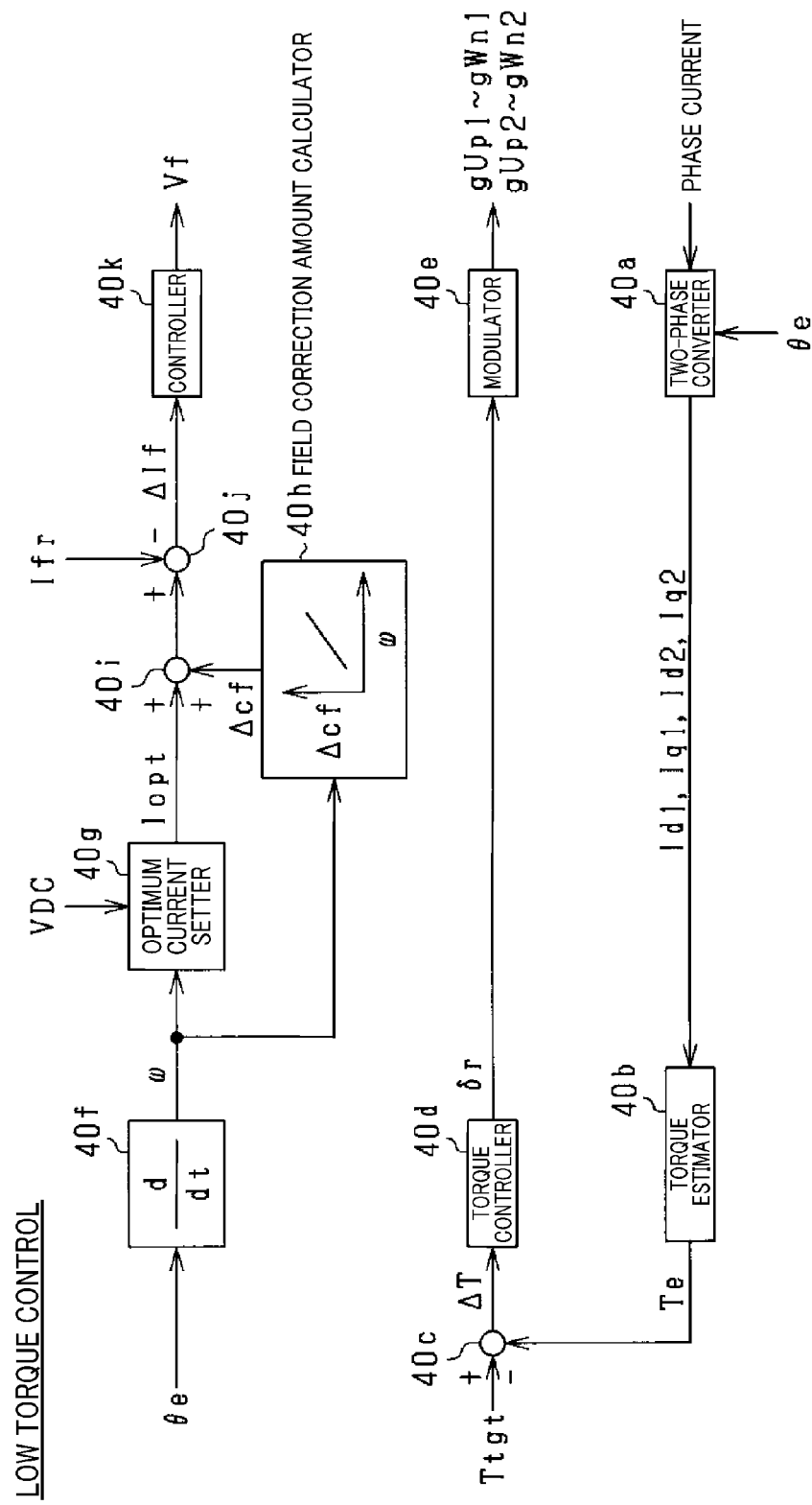
FIG. 6 is a block diagram showing process functions for executing the low torque control in the control apparatus shown in FIG. 1.

FIG. 6 illustrates an example of a functional block diagram showing the functions of the first operation unit 40A1 in the control apparatus 40, that is, the functions equivalent to the task of executing the low torque control. Specifically, FIG. 6 illustrates a functional block diagram showing the low torque control function in the power running mode.

As shown in FIG. 6, the control apparatus 40 includes a two-phase converter 40a, a torque estimator 40b, a torque deviation calculator 40c, a torque controller 40d, and a modulator 40e. Further, the control apparatus 40 includes a speed calculator 40f, an optimum current setter 40g, a field correction amount calculator 40h, a field corrector 40i, a field deviation calculator 40j, and a field controller 40k.

The two-phase converter 40a converts the U-, V-, and W-phase currents into a first d-axis current Id1 and a first q-axis current Iq1 in the dq coordinate system, based on the electrical angle, referred to as θe, detected by the rotation angle sensor 30, and the three-phase currents flowing in the first winding group 10*a* detected by the phase current detector 33. The three-phase currents are U-, V-, and W-phase currents in the fixed coordinate system corresponding to the first winding group 10*a* defined in the stator 13.

The two-phase converter 40*a* converts the electrical angle θe and the three-phase currents flowing in the second winding group 10*b* detected by the phase current detector 33 into a second d-axis current Id2 and a second q-axis current Iq2 in the dq coordinate system. The three-phase currents are U-, V-, and W-phase currents in the fixed coordinate system corresponding to the second winding group 10*b* defined in the stator 13.

The torque estimator 40*b* calculates estimated torque Te of the motor 10 using the following equation (eq5) using the d and q-axis currents Id1, Iq1, Id2, and Iq2 and the field current Ifr as the inputs.

$$Te = Pn\{Mf \cdot Ifr \cdot Iq1 + Mf \cdot Ifr \cdot Iq2 + (Ld-Lq) \cdot Id1 \cdot Iq1 + (Ld-Lq) \cdot Id2 \cdot Iq2 + (Md-Mq) \cdot (Id1 \cdot Iq2 + Id2 \cdot Iq1)\} \quad (eq5)$$

Where Pn denotes the number of pole pairs of the motor 10, Mf denotes the mutual inductance on the d-axis between each winding group 10*a*, 10*b* and the field winding 11, Md denotes the mutual inductance on the d-axis between the first and second winding groups 10*a* and 10*b*, and Mq denotes the mutual inductance on the q-axis between the first and second winding groups 10*a* and 10*b*.

The torque deviation calculator 40*c* calculates a torque deviation ΔT which is the deviation between the estimated torque Te and the target torque Ttgt. Specifically, the torque deviation calculator 40*c* calculates the torque deviation ΔT by subtracting the estimated torque Te from the target torque Ttgt.

The torque controller 40*d* calculates a voltage phase δr of a voltage vector as a manipulated variable for feedback controlling the estimated torque Te to the target torque Ttgt based on the torque deviation ΔT. Specifically, the torque controller 40*d* for example performs proportional-integral-derivative control based on the torque deviation ΔT, thus calculating the voltage phase δr.

On the basis of the voltage phase δr calculated by the torque controller 40*d*, the modulator 40*e* generates first control signals gUp1-gWn1 and second control signals gUp2-gWn2 for controlling the estimated torque Te to the target torque Ttgt. The modulator 40*e* outputs the generated first control signals gUp1-gWn1 to the first inverter INV1, i.e. the respective switches SUp1-SWn1 of the first inverter INV1, and outputs the generated second control signals gUp2-gWn2 to the second inverter INV2, i.e. the respective switches SUp2-SWn2 of the second inverter INV2.

On the other hand, the speed calculator 40*f* calculates the electrical angular velocity ω using differentiation of the electrical angle θe.

On the basis of the electrical angular velocity ω and a battery voltage VDC detected by the voltage sensor 31, the optimum current setter 40*g* sets the optimum current Iopt; the optimum current Iopt is the target value of the field current in the low torque control.

Specifically, the optimum current setter 40*g* sets the optimum current Iopt using Va in the relationship If=Va/ω*Lf of the equation (eq4) as the battery voltage VDC. This enables, even if the inter-terminal voltage of the high voltage battery 22 decreases greatly due to the motor 10 being driven as a starter, the proper optimum current Iopt depending on the battery voltage VDC to be easily calculated.

When the electrical angular velocity ω is high, the field correction amount calculator 40*h* calculates a field correction amount, i.e. a field correction current, Δcf (≥0), such that the field correction amount Δcf is larger than the field correction amount Δcf calculated when the electrical angular velocity ω is low.

Specifically, the field correction amount calculator 40*h* calculates the field correction amount Δcf such that, the larger the electric angular velocity ω is, the larger the calculated field correction amount Δcf is. This operation is to reduce iron loss in addition to copper loss.

Figure 7:
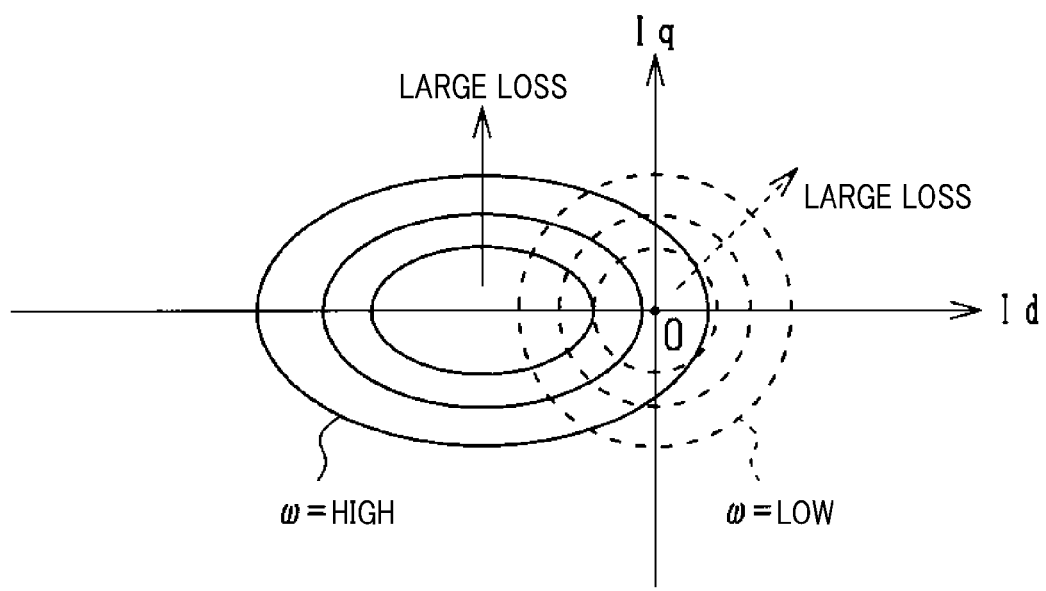
FIG. 7 is a diagram showing, in a dq coordinate system, the relationship between an electrical angular velocity and total loss including copper loss and iron loss.

FIG. 7 illustrates a schematic diagram of the total loss including copper loss and iron loss in the dq coordinate system. When the electrical angular velocity ω is high, a region with large iron loss in the dq coordinate system shifts in the negative direction of the d-axis as compared with a case where the electrical angular velocity ω is low. Thus, as shown in FIG. 7, when the electrical angular velocity ω is high, a region with large total loss shifts in the negative direction of the d-axis as compared with a case where the electrical angular velocity ω is low. Accordingly, in order to reduce the total loss including iron loss in addition to copper loss, the optimum current Iopt needs to be corrected according to the electrical angular velocity ω. Thus, the field correction amount calculator 40*h* is provided in the control apparatus 40.

The field corrector 40*i* adds the field correction amount Δcf to the optimum current Iopt set by the optimum current setter 40*g*, and outputs a corrected current (Iopt+Δcf). In the first embodiment, for example, the field correction amount calculator 40*h* and the field corrector 40*i* correspond to correction means.

The field deviation calculator 40*j* calculates a field deviation ΔIf which is the deviation between the output value (Iopt+Δcf) of the field corrector 40*i* and the field current Ifr. Specifically, the field deviation calculator 40*j* calculates the field deviation ΔIf by subtracting the field current Ifr from the output value (Iopt+Δcf).

On the basis of the field deviation ΔIf, the field controller 40*k* calculates, as the manipulated variable for feedback controlling the field current Ifr to the output value (Iopt+Δcf), a field command voltage Vf which is a DC voltage command value to be applied to the field winding 11.

In the first embodiment, the field controller 40*k* performs proportional-integral control based on the field deviation ΔIf, thus calculating the field command voltage Vf. The calculated field command voltage Vf is input to the field circuit 36. The field circuit 36 is driven to apply the field command voltage Vf to the field winding 11.

When performing the low torque control in the regenerative mode, the torque controller 40*d* calculates the voltage phase δr as the manipulated variable for feedback controlling the current electric power Pe generated by the motor 10 to target power Ptgt based on the torque deviation ΔT. The remaining operations are the same as the above operations in the power running mode.

Figure 8:
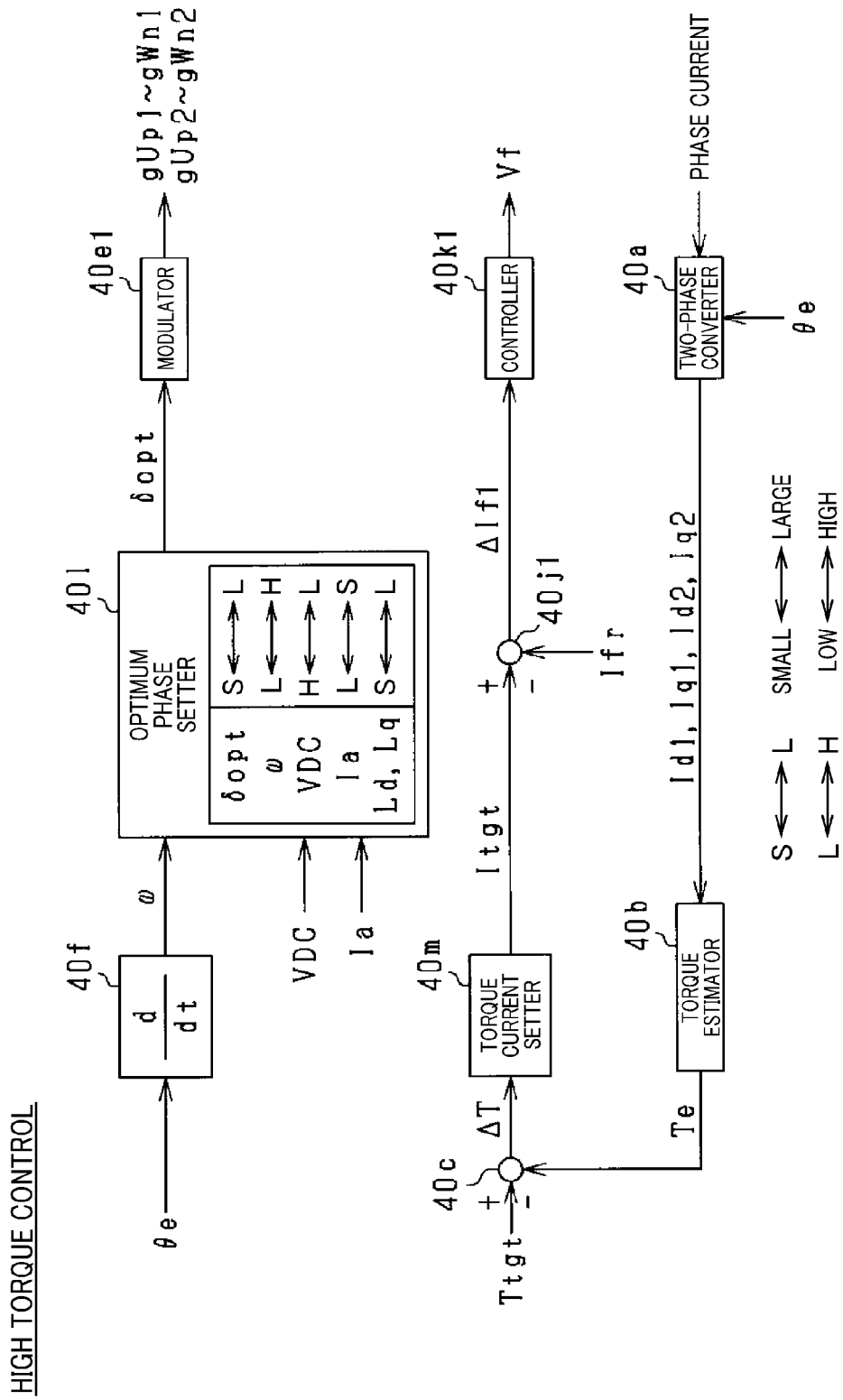
FIG. 8 is a block diagram showing process functions for executing the high torque control in the control device shown in FIG. 1.

Next, FIG. 8 illustrates an example of a functional block diagram showing the functions of the second operation unit 40A2 in the control apparatus 40, that is, the functions equivalent to the task of executing the high torque control. Specifically, FIG. 8 illustrates a functional block diagram in the power running mode. In FIG. 8, for the sake of convenience, operations that are the same those shown in FIG. 6 are denoted by the same reference numbers, and the descriptions thereof are omitted.

As shown in FIG. 8, the control apparatus 40 includes, in addition to the two-phase converter 40*a*, torque estimator 40b, torque deviation calculator 40c, and speed calculator 40f, a target current setter 40m, a filed deviation calculator 40j1, a field controller 40k1, an optimum phase setter 401, and a modulator 40e1.

The target current setter 40m sets a target current Itgt which is the target value of the field current in the high torque control as the manipulated variable for feedback controlling the estimated torque Te to the target torque Ttgt based on the torque deviation ΔT. Specifically, the target current setter 40m can perform proportional-integral-derivative control based on the torque deviation ΔT, thus setting the target current Itgt. The set target current Itgt is input to the field deviation calculator 40j1.

The high torque control in the regenerative mode sets the target current Itgt as the manipulated variable for feedback controlling the current generated electric power Pe of the motor 10 to the target power Ptgt.

The field deviation calculator 40j1 calculates a field deviation ΔIf1 which is the deviation between the target current Itgt and the field current Ifr. Specifically, the field deviation calculator 40j1 calculates the field deviation ΔIf1 by subtracting the field current Ifr from the target current Itgt. Like the low torque control, the field controller 40k1 calculates, based on the field deviation ΔIf1, a field command voltage Vf as the manipulated variable for feedback controlling the field current Ifr to the target current Itgt; the field command voltage Vf is a DC voltage command value to be applied to the field winding 11.

On the other hand, the optimum phase setter 401 sets an optimum phase δopt as a function of the electrical angular velocity ω, the battery voltage VDC, and the current amplitude Ia; the optimum phase δopt is the voltage phase in the high torque control.

Specifically, the optimum phase δopt is configured to place, in the dq coordinate system, the current vector to one of the intersections, which is for example, the intersection B1, B2, or B3, of the voltage limitation circle and the equal torque line, i.e. the equal target torque line; inputting the present battery voltage VDC, the present electrical angular velocity ω, and the present target current Itgt into the above equation (eq1) for example obtains the voltage limitation circle. One of the intersections is referred to as a target point, which has the absolute value of the d-axis current component smaller than the d-axis current component that the other of the intersections has.

The equal torque line, i.e. the equal target torque line, represents the trajectory of the current vector in the dq coordinate system under the condition that the field current is set to the target current Itgt and the target torque Ttgt is set to a constant value. The equal torque line can be expressed in accordance with the equation (eq5).

Figure 9:
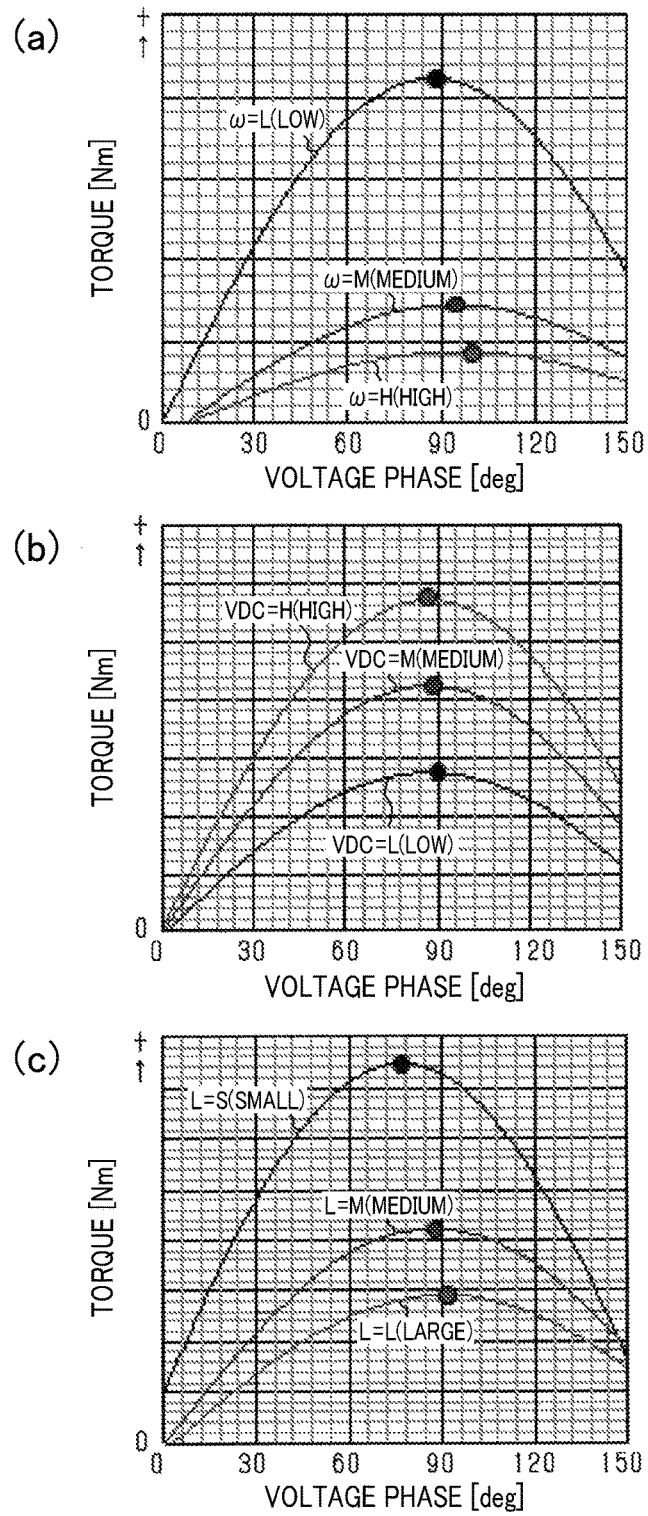
FIG. 9 includes graphs showing the relationships between torque and the voltage phase while a battery voltage and an inductance are changed.

The optimum phase setter 401 sets the optimum phase δopt such that, the higher the electrical angular velocity ω is, the higher the optimum phase δopt is. This is because, as shown in (a) of FIG. 9, the voltage phase at which the output torque of the motor 10 becomes the peak value increases as the electrical angular velocity ω increases. In addition, the optimum phase setter 401 sets the optimum phase δopt such that, the lower the battery voltage VDC is, the higher the set optimum phase δopt is. This is because, as shown in (b) of FIG. 9, the voltage phase at which the output torque of the motor 10 becomes the peak value increases as the battery voltage VDC decreases.

Additionally, the optimum phase setter 401 sets the optimum phase δopt such that, the smaller the current amplitude Ia is, the greater the optimum phase δopt is. This is because, the larger the current amplitude Ia is, the smaller the d and q-axis inductances Ld and Lq are due to the influence of magnetic saturation, resulting in the optimum phase δopt being smaller. The current amplitude Ia can be calculated based on, for example, the combination of the first d-axis current Id1 and the first q-axis current Iq1, or the combination of the second d-axis current Id2 and the second q-axis current Iq2.

Note that the optimum phase setter 401 of the first embodiment sets the optimum phase δopt such that, the greater the d and q-axis inductances Ld and Lq of the motor 10 are, the greater the optimum phase δopt is. This is because, as shown in (c) of FIG. 9, the voltage phase at which the torque of the motor 10 becomes the peak value increases as the inductances Ld and Lq increase. Further, the optimum phase δopt can be set using, for example, a map in which the electrical angular velocity ω, the battery voltage VDC, the current amplitude Ia, and the inductances Ld and Lq are associated with the optimum phase δopt.

Note that the optimum phase δopt in the regenerative mode is configured to place, in the dq coordinate system, the current vector to one of the intersections of the voltage limitation circle expressed in the equation (eq1) and an equal power line, i.e. the equal target power line. One of the intersections is referred to as a target point, which has the absolute value of the d-axis current component smaller than the d-axis current component that the other of the intersections has.

The equal power line, i.e. the equal target power line, represents the trajectory of the current vector of the motor 10 in the dq coordinate system under the condition that the field current is set to the target current Itgt and the target power Ptgt is set to a constant value.

Returning to the explanation of FIG. 8, the optimum phase δopt set by the optimum phase setter 401 is input to the modulator 40e1. The modulator 40e1 generates the first control signals gUp1-gWn1 and the second control signals gUp2-gWn2 based on the optimum phase δopt.

Figure 10:
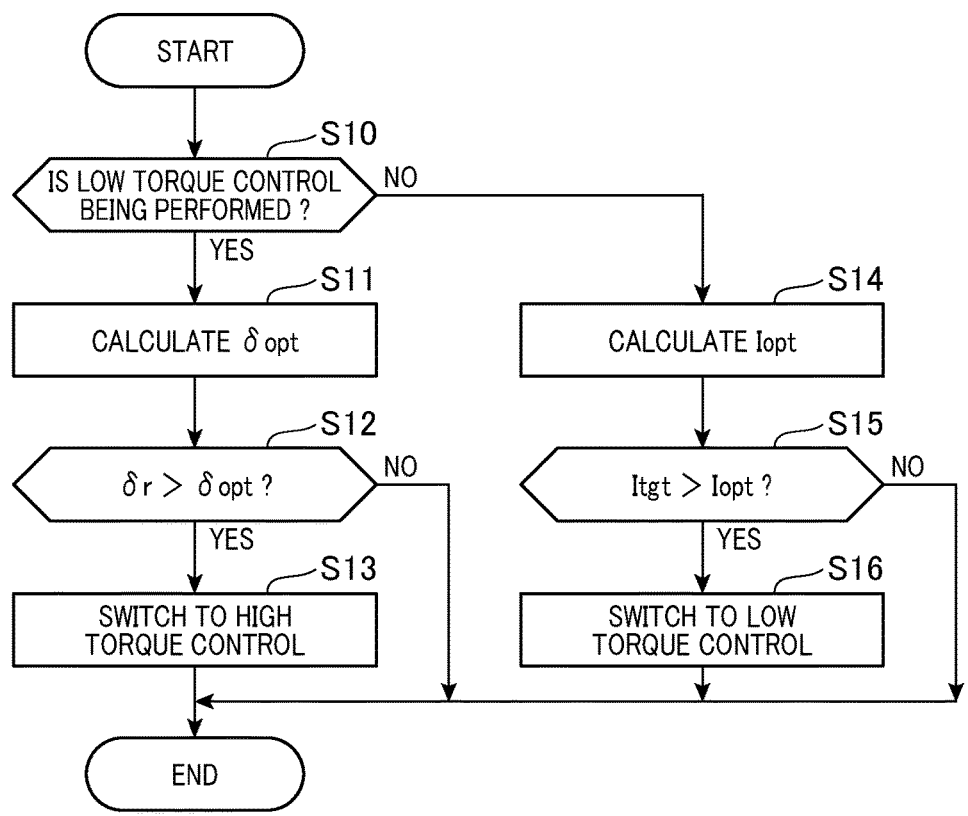
FIG. 10 is a flowchart schematically showing an example of a switching process to switch between the low torque control and the high torque control executed by the control apparatus shown in FIG. 1.

Next, the following describes the switching routine to switch between the low torque control and the high torque control with reference to FIG. 10.

FIG. 10 is a flowchart illustrating the switching routine. For example, the control apparatus 40 repeatedly executes this switching routine at a predetermined processing cycle. Note that FIG. 10 illustrates the switching routine in the power running mode.

In the switching routine, the control apparatus 40 determines whether the control apparatus 40 is performing the low torque control in step S10.

If the determination in step S10 is affirmative, the switching routine proceeds to step S11. In step S11, the control apparatus 40 calculates the optimum phase δopt, which corresponds to, for example, a determination phase. For example, the optimum phase setter 401 shown in FIG. 8 can calculate the optimum phase δopt set forth above. In the first embodiment, the operation in step S11 corresponds to, for example, a determination phase calculation means.

In the following step S12, the control apparatus 40 determines whether the voltage phase δr calculated by the torque controller 40d exceeds the optimum phase δopt calculated in step S11. This operation is an operation for determining whether it is the time to switch from the low torque control to the high torque control. If the determination in step S12 is affirmative, the switching routine proceeds to step S13. In step S13, the control apparatus 40 switches from the low torque control to the high torque control, and carries out the high torque control. In the first embodiment, the operations in steps S12 and S13 correspond to, for example, a first switching means.

Otherwise, the determination in step S10 is negative, the control apparatus 40 determines that the control apparatus 40 is executing the high torque control, and the switching routine proceeds to step S14.

In step S14, the control apparatus 40 calculates the optimum current Iopt, which corresponds to, for example, a determination current. For example, the optimum current setter 40g shown in FIG. 6 can calculate the optimum current Iopt. In the first embodiment, the operation in step S14 corresponds to, for example, a determination current calculation means.

In the following step S15, the control apparatus 40 determines whether the target current Itgt set by the target current setter 40m has become lower than the optimum current Iopt calculated in step S14. This operation is an operation for determining whether it is the time to switch from the high torque control to the low torque control. If the determination in step S15 is affirmative, the switching routine proceeds to step S16. In step S16, the control apparatus 40 switches from the high torque control to the low torque control, and carries out the low torque control. In the first embodiment, the operations in steps S15 and S16 correspond to, for example, a second switching means.

Figure 11:
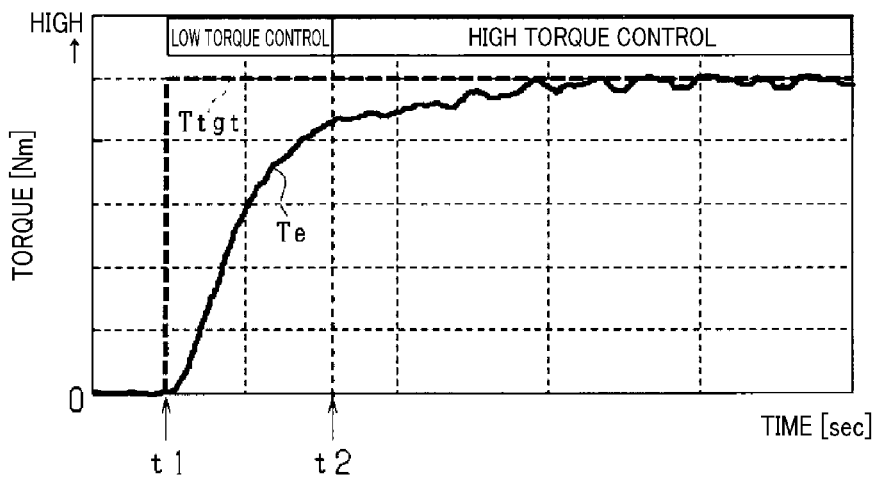
FIG. 11 is a time chart showing an example of the switching process shown in FIG. 10.

FIG. 11 shows an example of how the output torque of the motor 10 is changed when the switching routine is executed by the control apparatus 40 in the power running mode according to the first embodiment.

In the example of the change in the output torque of the motor 10 shown in FIG. 11, the target torque Ttgt increases stepwise at time t1, and, for example, changes from the low torque region to the high torque region. At this change point of time t1, the estimated torque Te is feedback controlled to the target torque Ttgt by the low torque control.

Thereafter, at time t2, it is determined that the voltage phase δr has exceeded the optimal phase δopt, which corresponds to affirmative determination in step S12 of FIG. 10, so that the low torque control is switched to the high torque control.

That is, the torque control switching routine according to the first embodiment enables the change in the torque of the motor 10 to be reduced (see FIG. 11) at the torque-control switching time, i.e. the time t2. This is because setting the optimum phase δopt, which is used to the high torque control, as the determination value for determining whether the low torque control is switched to the high torque control (see step S12) enables the amount of change in the voltage phase between before and after the torque-control switching to be close to 0.

Figure 12:
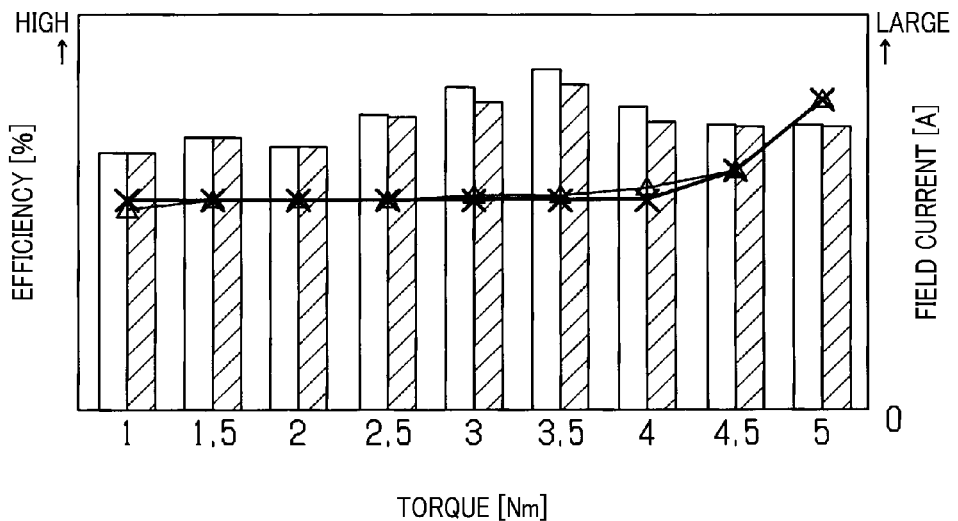
FIG. 12 is a diagram showing an advantageous effect achieved by the control apparatus according to the first embodiment.

FIG. 12 illustrates how the power efficiency of the motor 10 and the field current If are changed during execution of the low torque control according to the first embodiment when the output torque of the motor 10 is used as a parameter. As a comparative example, FIG. 12 also shows how the maximum efficiency of the power efficiency and the field current corresponding to the maximum efficiency are changed. Note that the inventors have repeatedly set the field current to one of various values to search for the maximum power efficiency in the obtained power efficiencies, and have determined that the searched maximum power efficiency has the maximum efficiency.

FIG. 12 illustrates
1. A value of the field current corresponding to the maximum efficiency for each value of the parameter, i.e. for each value of the output torque 2. A value of the field current simply calculated based on the equation (eq4) according to the first embodiment for each value of the parameter, i.e. for each value of the output torque For each value of the parameter, the value of the field current corresponding to the maximum efficiency substantially matches with the value of the field current simply calculated based on the equation (eq4) according to the first embodiment. A large number of man-hours are required to set various values to the field current to thereby obtain the values of the maximum power efficiency for the respective values of the parameter.

Thus, the value of the power efficiency and the value of the maximum efficiency according to the first embodiment substantially match with each other for each value of the parameter, i.e. the output torque.

Specifically, the control apparatus 40 according to the first embodiment results in reduction of power loss while executes simple control of the motor 10 without
1. Preparing a map defining values of the field current which require high workload
2. Constructing a motor control algorithm based on this prepared map.

The control apparatus 40 according to the first embodiment achieves the following advantageous effects.

The control apparatus 40 executes the low torque control for the low torque region set with regard to the controlled variable, i.e. the output torque or the generated power, for the motor 10. This low torque control manipulates the voltage phase δr so as to control the controlled variable of the motor 10 to a target value while controlling the field current Ifr such that the deviation between the amplitude of the induced voltage and the amplitude of the voltage applied to the motor 10 is equal to or smaller than a predetermined value.

This configuration eliminates the need of preparing a map for calculating a value of the field current that minimizes the current amplitude representing the magnitude of the current vector of the motor 10. This therefore enables simpler control to match the controlled variable of the motor 10 with the target value while having reduced power loss.

Additionally, the control apparatus 40 executes the high torque control for the high torque region set with regard to the controlled variable, i.e. the output torque or the generated power, for the motor 10. This high torque control manipulates the field current Ifr so as to control the controlled variable of the motor 10 to a target value.

This configuration achieves a first advantageous effect that enables the controlled variable of the motor 10 to appropriately follow the target value even if the target value becomes high.

The control apparatus 40 performs the low torque control to set, based on the electrical angular velocity ω, the optimum current Iopt, which is the field current that makes the amplitude of the induced voltage induced in the motor 10 match with the amplitude of the applied voltage of the motor 10. This achieves a second advantageous effect of further improving the advantageous effect of power loss reduction during the low torque control.

The control apparatus 40 performs the low torque control to correct, based on the electrical angular velocity ω, the optimum current Iopt in the direction that makes the iron loss in the motor 10 small. This configuration achieves a third advantageous effect of efficiently reducing the iron loss in addition to the copper loss of the motor 10.

The control apparatus 40 performs the high torque control to control the field current Ifr so as to feedback control the controlled variable of the motor 10 to the target value, while adjusting the voltage phase. The adjustment of the voltage phase causes the current vector to be located at, i.e. to belong to, the vertex of the voltage limitation circle where the absolute value of the q-axis current Iq becomes maximum, or at a position shifted closer to the q-axis from the vertex.

If the voltage phase were set such that the current vector is located to a side opposite to the q-axis from the vertex where the absolute value of the q-axis current Iq becomes the maximum on the voltage limitation circle, the amount of useless d-axis current would increase, and therefore the power loss would increase. Thus, the first embodiment achieves a fourth advantageous effect of further enhancing reduction of power loss.

In particular, the first embodiment adjusts the voltage phase to the optimum phase δopt in the high torque control, thus increasing the controlled variable of the motor 10 while reducing power loss.

The control apparatus 40 performs the high torque control to set the optimum phase δopt based on the electrical angular velocity ω, the current amplitude Ia, the battery voltage VDC, and the inductances Ld and Lq. This configuration achieves a fifth advantageous effect of further increasing the controlled variable of the motor 10.

While performing the low torque control, the control apparatus 40 switches from the low torque control to the high torque control when it is determined that the voltage phase δr has exceeded the optimum phase δopt. While performing the high torque control, the control apparatus 40 switches from the high torque control to the low torque control when it is determined that the target current Itgt has become lower than the optimum current Iopt. This configuration therefore efficiently reduces the fluctuations in the torque of the motor 10 each time one of the high torque control and low torque control is switched to the other.

(Second Embodiment)

The following describes the second embodiment of a control system including a control apparatus for a rotary electric machine according to the present invention with reference to the corresponding drawings while focusing on the differences between the first and second embodiments. In the second embodiment, the control apparatus 40 performs control that causes the field current to rapidly rise at the time of switching from the low torque control to the high torque control.

Figure 13:
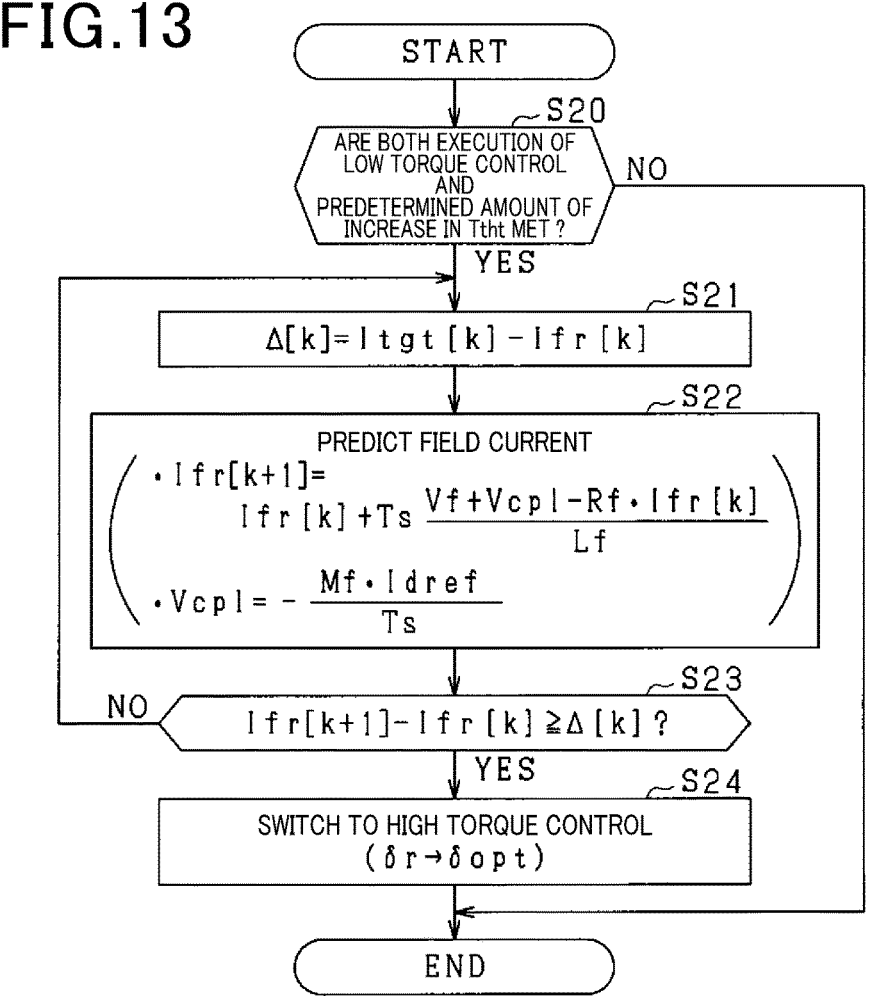
FIG. 13 is a flowchart schematically showing an example of a rapid switching process to switch from the low torque control to the high torque control according to the second embodiment of the present invention.

FIG. 13 shows the procedure of a rapid switching routine from the low torque control to the high torque control according to the second embodiment. For example, the control apparatus 40 repeatedly executes this routine at a certain processing cycle. Note that FIG. 13 illustrates the rapid switching routine in the power running mode as an example.

In the rapid switching routine, the control apparatus 40 determines whether the logical conjunction of the first condition that the low torque control is currently being executed and the second condition that the target torque Ttgt has increased by a predetermined amount from the previous rapid switching routine is true or not, that is, whether both the first condition and the second condition are satisfied in step S20. The second condition is a condition for determining whether the target torque Ttgt has suddenly increased. If the current rapid switching routine is the first rapid switching processing, the second condition is set to be negative.

When the determination in step S20 is negative, the control apparatus 40 terminates the rapid switching routine. In this case, the determination of switching from the low torque control to the high torque control is executed based on the switching process shown in FIG. 10.

On the other hand, when the determination in step S20 is affirmative, the rapid switching routine proceeds to step S21.

In step S21, the control apparatus 40 assumes that k represents the current cycle of the rapid switching routine (k is a natural number not smaller than 1), and calculates a current deviation $\Delta[k]$ which is the difference between the target current Itgt[k] in the current cycle of the rapid switching routine k and the field current Ifr[k] in the current cycle of the rapid switching routine k.

In the second embodiment, the control apparatus 40 calculates the current deviation $\Delta[k]$ by subtracting the field current Ifr[k] in the current cycle of the rapid switching routine from the target current Itgt[k] in the current cycle of the rapid switching routine. The field current Ifr[k] represents the field current detected by the field current sensor 32 in the current cycle of the rapid switching routine. Further, the target current Itgt[k] represents a target current set by the target current setter 40m in the current cycle of the rapid switching routine on the assumption that the voltage phase is set to the optimum phase δopt determined by the optimum phase setter 40l.

In the following step S22, the control apparatus 40 calculates a prediction of the field current in the next (k+1) cycle of the rapid switching routine, which is hereinafter referred to as predicted current Ifr[k+1], based on the field current Ifr[k], the field command voltage Vf, and the d-axis reference current Idref in the current cycle of the rapid switching routine. In the second embodiment, the operation in this step S22 corresponds to, for example, a prediction means. Specifically, the predicted current Ifr[k+1] is a field current in the next cycle of the rapid switching routine calculated on the assumption that the voltage phase is increased to the optimum phase δopt in the low torque control, that is, on the assumption that a field weakening current is increased.

In the second embodiment, the control apparatus 40 can calculate the predicted current Ifr[k+1] using the following equation (eq6):

$$Ifr[k+1] = Ifr[k] + Ts\left(\frac{Vf + Vcpl - Rf \cdot Ifr[k]}{Lf}\right) \quad \text{(eq 6)}$$

Where:

$$Vcpl = -\frac{MF \cdot Idref}{Ts}$$

Rf represents the winding resistance of the field winding 11

Ts represents the processing cycle, i.e. the time interval between the cycles of the rapid switching routines, of the control apparatus 40

Vp1 represents the interference term between the d-axis current and the field current Idref represents the d-axis current estimated when the present voltage phase is increased to the optimum phase δopt Specifically, the estimated d-axis current represents the sum of the d-axis current in the first winding group 10a and the d-axis current in the second winding group 10b.

The above equation (eq6) shows that changing the d-axis currents of the inverters INV1 and INV2 in the negative direction enables 1. The interference term Vp1 to be increased in the positive direction
2. The field current Ifr to be increased.

The above equation (eq6) is a model equation based on a predetermined voltage equation of the field winding 11. More specifically, the above equation (eq6) is derived by discretizing the following voltage equation (eq7) by backward differencing.

Figure 14:
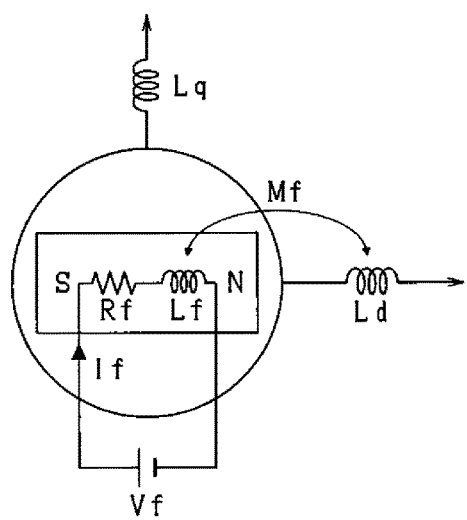
FIG. 14 is a diagram showing an equivalent circuit of the field winding shown in FIG. 1.

In the following expression (eq7), s represents a Laplace operator, i.e. a differential operator. FIG. 14 shows an equivalent circuit of the field winding 11 including the d-axis and the q-axis. Note that N represents a magnetic pole, i.e. an N pole, and S represents a magnetic pole, i.e. an S pole. The equivalent circuit of the field winding 11 is a series circuit of a resistor Rf and an inductance Lf; the series circuit is based on the field command voltage Vf as its power source.

$$Vf=(Rf+s \cdot Lf) \cdot If+s \cdot Mf \cdot (Id1+Id2) \tag{eq7}$$

Returning to the explanation of FIG. 13, in the following step S23, the control apparatus 40 determines whether the value obtained by subtracting the field current Ifr[k] of the current cycle of the rapid switching routine from the predicted current Ifr[k+1] is equal to or greater than the electric current deviation Δ[k] calculated in step S21. This operation is an operation for determining whether the field current reaches the target current Itgt in the next cycle of the rapid switching routine when it is assumed that the voltage phase has been increased to the optimum phase δopt. In the second embodiment, the operation of in step S23 corresponds to, for example, a reaching determination means.

When the determination in step S23 is negative, the control apparatus 40 returns to the operation in step S21 and repeats the operation in step S21.

Otherwise, when the determination in step S23 is affirmative, the control apparatus 40 determines that the field current will reach the target current Itgt in the next cycle of the rapid switching routine. Then, the rapid switching routine proceeds to step S24.

In step S24, the control apparatus 40 increases the voltage phase to the optimum phase δopt. Then, the control apparatus 40 switches the low torque control to the high torque control.

For example, the switching from the high torque control to the low torque control is executed based on the switching routine shown in FIG. 10.

Figure 15:
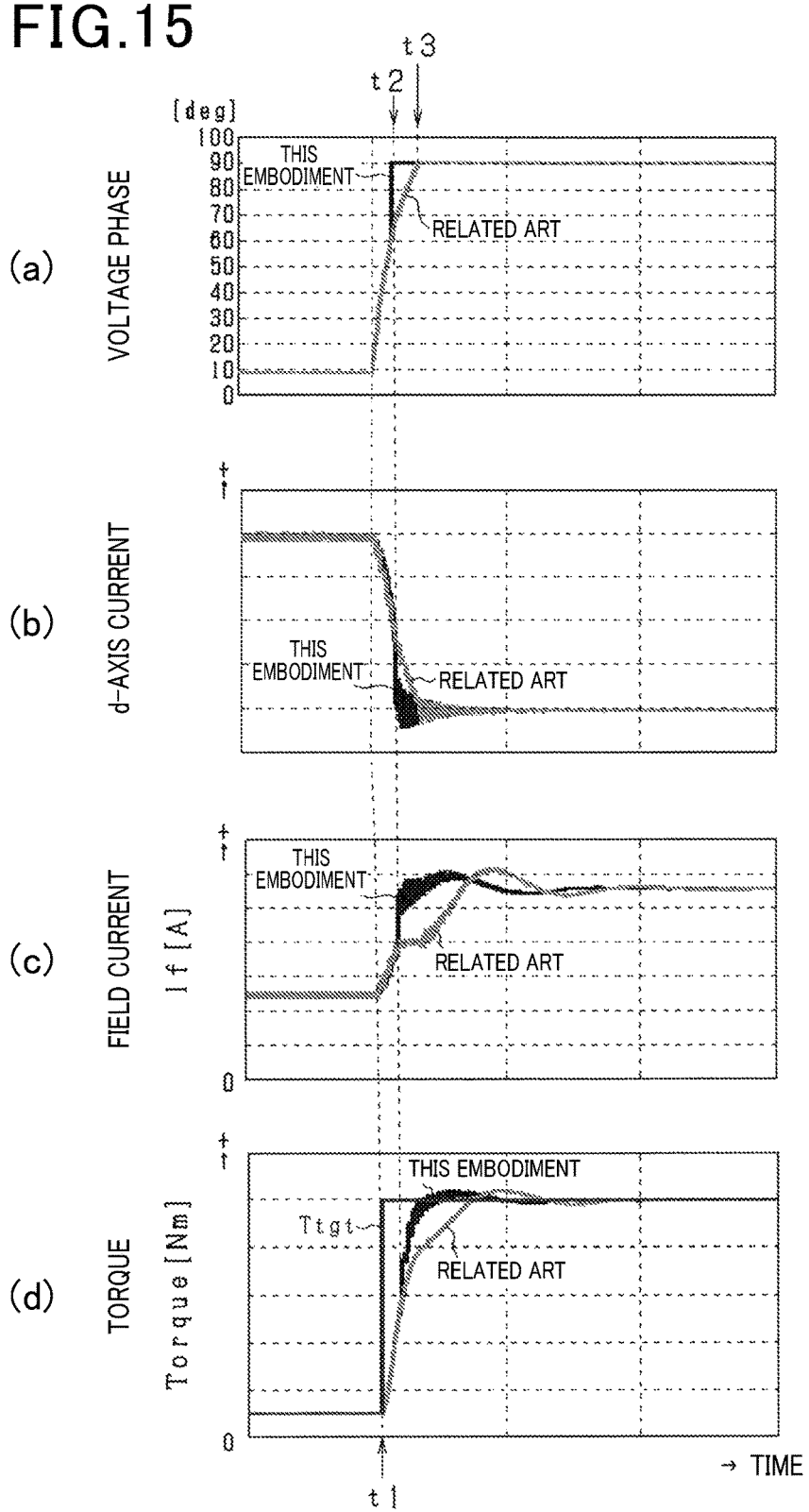
FIG. 15 is a time chart schematically showing an example of the rapid switching process according to the second embodiment.

FIG. 15 shows the transition of each parameter when the rapid switching routine is executed in the power running mode according to the second embodiment.

Specifically, (a) of FIG. 15 shows the transition of the voltage phase, (b) of FIG. 15 shows the transition of the d-axis current, (c) of FIG. 15(c) shows the transition of the field current, and (d) of FIG. 15 shows the transition of the output torque of the motor 10.

In addition, FIG. 15 also shows the transition of each waveform of a related art. The related art is to only perform the switching routine according to the first embodiment.

As shown in FIG. 15, the voltage phase starts to rise in response to an abrupt increase in the target torque Ttgt at time t1 during the low torque control. Thereafter, at time t2, it is determined that the value obtained by subtracting the field current Ifr[k] of the current cycle of the rapid switching routine from the predicted current Ifr[k+1] is equal to or larger than the current deviation Δ[k] (YES in step S23). For this reason, the voltage phase is increased to the optimum phase δopt at once (see time t2, step S24) before the voltage phase δr calculated by the torque controller 40d reaches the optimum phase δopt (see time t3). This causes the d-axis current Id to decrease greatly in the negative direction, so that the field current If rises to around the target current Itgt at once. Accordingly, this enables, as an advantageous effect, the controlled variable of the motor 10, that is, the output torque, to quickly follow the target value, i.e. the target torque Ttgt.

(Third Embodiment)

The following describes the third embodiment of a control system including a control apparatus for a rotary electric machine according to the present invention with reference to the corresponding drawings while focusing on the differences between the second and third embodiments. In the third embodiment, the control apparatus 40 changes the method of rapidly raising the field current.

FIG. 16 shows the procedure of a rapid switching routine from the low torque control to the high torque control according to the third embodiment. For example, the control apparatus 40 repeatedly executes this routine at a certain processing cycle. In FIG. 16, for the sake of convenience, operations that are the same those shown in FIG. 13 are denoted by the same step numbers. Note that FIG. 16 illustrates the rapid switching routine in the power running mode as an example.

In the rapid switching routine, when the determination in step S20 is affirmative, the rapid switching routine proceeds to step S25. In step S25, the control apparatus 40 waits until the voltage phase δr calculated by the torque controller 40d becomes equal to or greater than a defined phase δa.

In the third embodiment, the defined phase δa has a predetermined constant value which is larger than 0 and smaller than the optimum phase δopt. Specifically, the defined phase δa is set to a value at which the field current If is estimated to reach the target current Itgt in the next cycle of the rapid switching routine when it is assumed that the voltage phase has been increased to the optimum phase δopt in the current cycle of the rapid switching routine. The defined phase δa is determined, for example, by experiments or the like in advance. In the third embodiment, the operation in step S25 corresponds to, for example, a reaching determination means. When the determination in step S25 is affirmative, the rapid switching routine proceeds to step S24.

The third embodiment described above achieves an advantageous effect to

1. Obtain the timing at which the field current If abruptly increases, i.e. abruptly rises using a simpler method
2. Cause the controlled variable of the motor 10, that is, the output torque, to quickly follow the target value, i.e. target torque Ttgt, at the timing at which the field current If abruptly increases.

(Other Embodiments)

In each of the above embodiments, the control apparatus 40 adjusts, in the low torque control, the field current Ifr so that the amplitude of the induced voltage generated in the armature winding matches with the amplitude of the applied voltage to the armature winding. However, the present invention is not limited to the configuration. For example, under the condition that the deviation between the amplitude of the induced voltage induced in the motor 10 and the amplitude of the applied voltage is equal to or smaller than a predetermined value, the control apparatus 40 can control the field current so that the amplitude of the induced voltage induced in the motor 10 is slightly larger than the amplitude of the applied voltage. In this modification, it is possible to achieve advantageous effects similar to those achieved in the first embodiment.

In addition, for example, under the condition that the deviation between the amplitude of the induced voltage and the amplitude of the applied voltage is equal to or smaller than a predetermined value, the control apparatus 40 can control the field current so that the amplitude of the applied voltage induced is slightly larger than the amplitude of the induced voltage.

The field correction amount calculator 40h shown in FIG. 6 can calculate the field correction amount Δcf based on, in addition to the electrical angular velocity ω, at least one of the currents (for example, their amplitudes) flowing through the armature windings, that is, the armature winding groups 10a and 10b, the battery voltage VDC, and the temperature of the motor 10. This is because the current flowing through the armature winding groups, the battery voltage VDC, and the temperature of the motor 10 may affect the iron loss.

The optimum phase setter 40i shown in FIG. 8 can used, for example, the q-axis current as the parameter for setting the optimum phase δopt in place of the current amplitude Ia which is the magnitude of the current vector. The optimum phase setter 40i can use at least one and part of the electrical angular velocity ω, the battery voltage VDC, the current amplitude Ia, and the inductances Ld, Lq as the above parameter. Further, the temperature of the motor 10 can be used as the parameter.

When calculating the optimum current Iopt using the above equation (eq 4), the control apparatus 40 can handle the amplitude of the applied voltage applied to the motor 10, i.e. the battery voltage, as a fixed value.

In each of the above embodiments, the motor 10 can be designed as a non-salient pole machine. In this modification, for example, the control apparatus 40 can use the q-axis current as the controlled variable of the motor in the power running mode instead of the output torque.

The motor 10 is not limited to a multi-turn winding motor, such as a double-turn winding motor, but can be designed as a motor having one armature winding group. In this case, for example, the second inverter INV2 is removed from the motor control system CS shown in FIG. 1. Further, the motor 10 is not limited to serving as a starter or a generator, but can serve as other devices including driving devices for in-vehicle auxiliary devices.

REFERENCE SIGNS LIST

10 . . . Motor, 11 . . . Field winding, 12 . . . Rotor, 13 . . . Stator, 10a, 10b . . . First and second winding groups, 40 . . . Control device.

The invention claimed is:

1. A control apparatus applied to a rotary electric machine comprising a rotor having a field winding through which a field current flows, and a stator having an armature winding through which an armature current flows, the control apparatus having, as a controlled variable, torque of the rotary electric machine or a parameter that has a positive correlation with the torque, the control apparatus comprising:

a first manipulation means that manipulates, as control for a predetermined first region with respect to the controlled variable, a voltage phase of a voltage vector applied to the armature winding while controlling the field current to cause a deviation between an amplitude of an induced voltage and an amplitude of a predetermined voltage to be equal to or smaller than a predetermined value, the induced voltage being generated in the armature winding based on rotation of the rotor, the predetermined voltage being applied to the armature winding; and a second manipulation means that manipulates, as control for a second region that is larger than the first region, the field current such that the controlled variable is controlled to the target value.

2. The control apparatus applied to a rotary electric machine according to claim 1, wherein:

the first control means controls, based on an electrical angular velocity of the rotary electric machine, the field current such that the amplitude of the induced voltage matches with the amplitude of the predetermined voltage, based on the electrical angular velocity of the rotary electric machine.

3. The control apparatus applied to a rotary electric machine according to claim 2, further comprising:

a correction means that corrects, based on the electrical angular velocity, a value of the field current controlled by the first control means in a direction that reduces iron loss of the rotary electric machine.

4. The control apparatus applied to the rotary electric machine according to claim 1, wherein:

the rotor of the rotary electric machine includes at least one pair of magnetic poles generated by the field winding that is energized;

the armature current is expressed as a current vector comprised of a d-axis current and a q-axis current in a dq coordinate system defined based on the at least one pair of magnetic poles;

a trajectory of the current vector with the amplitude of the predetermined voltage having a constant value is defined as a voltage limitation circle; and the second manipulation means manipulates the field current while performing a task to adjust the voltage phase such that the current vector is located at one of:

a vertex where an absolute value of the q-axis current becomes maximum on the voltage limitation circle a side closer to the q-axis of the dq coordinate system from the vertex on the voltage limitation circle.

5. The control apparatus applied to the rotary electric machine according to claim 4, wherein:

the second manipulation means performs, as the task to adjust the voltage phase, a task to adjust the voltage phase such that the current vector is located to be close to a target point, the target point being a selected one of intersections of an equal target value line and the voltage limitation circle, the equal target value line being a trajectory of the current vector where the target value is a constant value, an absolute value of the selected one of the intersections being smaller than an absolute value of the other of the intersections.

6. The control apparatus applied to the rotary electric machine according to claim 5, wherein:

the second manipulation means adjusts the voltage phase based on at least one of an electrical angular velocity of the rotary electric machine, a current flowing in the rotary electric machine, and the amplitude of the predetermined voltage applied to the armature winding.

7. The control apparatus applied to the rotary electric machine according to claim 5, wherein:

the first manipulation means controls, based on the electrical angular velocity of the rotary electric machine, the field current such that the amplitude of the induced voltage matches with the amplitude of the predetermined voltage, the control apparatus further comprising:
- a first switching means for switching, based on the voltage phase, from control of the controlled variable by the first control means to control of the controlled variable by the second control means; and
- a second switching means for switching, based on the field current, from the control of the controlled variable by the second control means to the control of the controlled variable by the first control means.

8. The control apparatus applied to the rotary electric machine according to claim 7, further comprising:
- a determination current calculation means configured to calculate a determination current that is a value of the field current during control of the controlled variable by the second manipulation means, the value of the field current causing the amplitude of the induced voltage to match with the amplitude of the predetermined voltage,
- wherein the second switching means switches from the control of the controlled variable by the second control means to the control of the controlled variable by the first control means when a manipulated value of the field current by the second manipulation means has become smaller than the determination current.

9. The control apparatus applied to the rotary electric machine according to claim 7, further comprising:
- a determination phase calculation means configured to calculate a determination phase that is a value of the voltage phase during control of the controlled variable by the first manipulation means, the value of the voltage phase causing the current vector to be located to be close to the target point on the voltage limitation circle,
- wherein the first switching means switches the control of the controlled variable by the first manipulation means to the control of the controlled variable by the second control means when a manipulated value of the voltage phase by the first manipulation means has exceeded the determination phase.

10. The control apparatus applied to the rotary electric machine according to claim 7, wherein a value of the field current required for controlling the controlled variable to the target value by the second manipulation means is set as a target current, the control apparatus further comprising:
- a reaching determination means configured to, during the control of the controlled variable by the first control means, determine whether the value of the field current reaches the target current when it is assumed that the armature current is increased in a canceling direction that cancels a field magnetic flux by field-based magnetic flux, the field magnetic flux being generated by supply of the field current, the field-based magnetic flux being generated by the armature current flowing through the armature winding, wherein:
- the first switching means increases the armature current in the canceling direction, and switches from the control of the controlled variable by the first control means to the control of the controlled variable by the second control means when it is determined by the reaching determination means that the value of the field current reaches the target current.

11. The control apparatus applied to the rotary electric machine according to claim 10, further comprising:
- a current increasing means for performing an increasing task to increase the armature current in the canceling direction at a predetermined processing cycle, wherein:
- the voltage phase has a defined phase that is smaller than the value of the voltage phase at which the electric current vector is located to be close to the target point on the voltage limitation circle,
- when the armature current is increased in a current cycle of the increasing task, the defined phase enabling the field current to reach close to the target current in a next cycle of the increasing task;
- the reaching determination means determines that the field current reaches the target current when it is determined that the voltage phase manipulated by the first manipulation means has increased and become equal to or greater than the defined phase; and
- the first switching means increases a present value of the voltage phase to the value of the voltage phase at which the electric current vector is located to be close to the target point on the voltage limitation circle, thus increasing the armature current in the canceling direction.

12. The control apparatus applied to the rotary electric machine according to claim 10, further comprising:
- a prediction means configured to, during the control of the controlled variable by the first manipulation means, perform a prediction task at a predetermined cycle to predict a value of the field current on an assumption that the current voltage phase has been increased to the voltage phase that causes the electric current vector to be located close to the target point on the voltage limitation circle, wherein:
- the reaching determination means is configured to, when it is determined that a predicted value of the field current by a current cycle of the prediction task of the prediction means has become equal to or greater than the target current, determine that a predicted value of the field current in a next cycle of the prediction task by the prediction means reaches the target current; and
- the first switching means increases a present value of the current voltage phase to the value of the voltage phase at which the electric current vector is located close to the target point on the voltage limitation circle, thus increasing the armature current in the canceling direction.

* * * * *